Feb. 9, 1954 P. L. TOLLISON ET AL 2,668,346

PREREGISTERING OF PLATES BY PROJECTION OF REGISTER MARKS

Filed April 27, 1948 5 Sheets-Sheet 1

INVENTORS
PAUL L. TOLLISON
CHARLES L. RICARDS
BY
Pennie, Edmonds, Morton & Barrows
ATTORNEYS INVENTORS
PAUL L. TOLLISON
CHARLES L. RICARDS
BY
Pennie, Edmonds, Morton & Barrows
ATTORNEYS

PREREGISTERING OF PLATES BY PROJECTION OF REGISTER MARKS

Filed April 27, 1948 5 Sheets-Sheet 3

INVENTORS
PAUL L. TOLLISON
CHARLES L. RICARDS
BY
Pennie, Edmonds, Morton & Barrows
ATTORNEYS Feb. 9, 1954 P. L. TOLLISON ET AL 2,668,346

PREREGISTERING OF PLATES BY PROJECTION OF REGISTER MARKS

Filed April 27, 1948 5 Sheets-Sheet 4

INVENTORS
PAUL L. TOLLISON
CHARLES L. RICARDS
BY
Pennie, Edmonds, Morton & Barrows
ATTORNEYS

PREREGISTERING OF PLATES BY PROJECTION OF REGISTER MARKS

Filed April 27, 1948 5 Sheets-Sheet 5

INVENTORS
PAUL L. TOLLISON
CHARLES L. RICARDS
BY
Pennie, Edmonds, Morton & Barrows
ATTORNEYS Patented Feb. 9, 1954 2,668,346

UNITED STATES PATENT OFFICE 2,668,346

PREREGISTERING OF PLATES BY PROJECTION OF REGISTER MARKS

Paul L. Tollison, North Plainfield, and Charles L. Ricards, South Plainfield, N. J., assignors to Wood Newspaper Machinery Corporation, Plainfield, N. J., a corporation of Virginia Application April 27, 1948, Serial No. 23,444

9 Claims. (Cl. 29—21)

This invention relates to improved apparatus for registering and trimming curved stereotype printing plates for use in rotary printing presses.

In color printing, a plurality of plates are used to print each cut, each of the several plates being inked with a different color. Unless such plates are in exact registry with each other, multiple impressions, blurring and off-color images are produced in the printed reproduction. To avoid these difficulties, it has been proposed to preform registry marks near the corner of each plate, to bring one plate to a position in which its register marks are approximately aligned with mechanical pointers held in fixed position, to trim the edges of that plate and then to successively register the other plates in turn with the same pointers and trim such other plates.

Machines previously proposed for the purpose explained have incorporated plate trimming mechanisms for trimming three edges of the plate while it is enclosed beneath a removable cover in a compartment. Enclosure of the plate is essential to prevent the throwing of metal chips during trimming. The compartment cover must be readily openable to permit access to the plate for setting it in registry with the mechanical pointers. The pointers on such known machines comprise pivoted rods with pointed ends that can be swung close to the plate surface to permit adjustment of the plate to a position in which the plate register marks are substantially aligned with the pointer ends. After registry, the pointers have to be swung back away from the plate to permit closing of the compartment cover preliminary to trimming. This arrangement necessitates bringing the pointer ends so close to the plate surface as to virtually touch it, if inaccurate setting due to errors arising from parallax are to be avoided. The operator must take care to avoid scratching of the plate with the pointer ends and to manually swing the pointers back to a retracted position before closing the cover. Closing of the cover without first swinging all pointers back disturbs the plate setting and damages the plate, and failure to accurately return the pointers to their original register setting over an untrimmed plate results in inaccurate register. A machine of the type generally described is disclosed in United States Patent No. 2,425,580.

Known plate registering and trimming machines of the type referred to have no stops for locating the plate longitudinally on the machine cylinder which carries the plate while it is being brought into registry and trimmed. Both of the curved end edges of the plate are trimmed, so that stops engaging these edges would foul the trimming cutters as the plate moves relative thereto.

The present invention has for its object the provision of an improved machine for registering and trimming curved printing plates which avoids the shortcomings of previously known machines by providing means for projecting index marks directly on the surface of the plate. The marks are projected by suitable projector units, each including a light source and provided with adjustable mountings which permit adjustment of projector units longitudinally and circumferentially of the plate. The mountings move the units parallel to the plate surface so that the projected images remain in focus at the plate surface regardless of movement of the units. The projector units are located outside of the machine compartment and clear of the path of its cover in all adjusted positions, so that the units need not be moved to permit closing or opening of the cover. Since the projector units project light beams carrying images of crossed lines or other suitable marks directly on the plate, no other illumination of the plate marks or registry means is required. The improved machine also includes an improved plate stop for locating the plate longitudinally on the cylinder that supports it during the registering and trimming operations. The stop does not rotate with the plate and so does not foul the plate end trimming cutter but moves longitudinally with the plate when the plate is adjustably moved to its position of registry. The improved stop moves away from the plate edge at the start of plate movement relative to the trimming cutter so that an angular plate edge does not bind against the stop during trimming.

In describing the invention in detail, reference will be made to the accompanying drawings in which an embodiment of the improved machine is illustrated. In the drawings.

Figure 2:
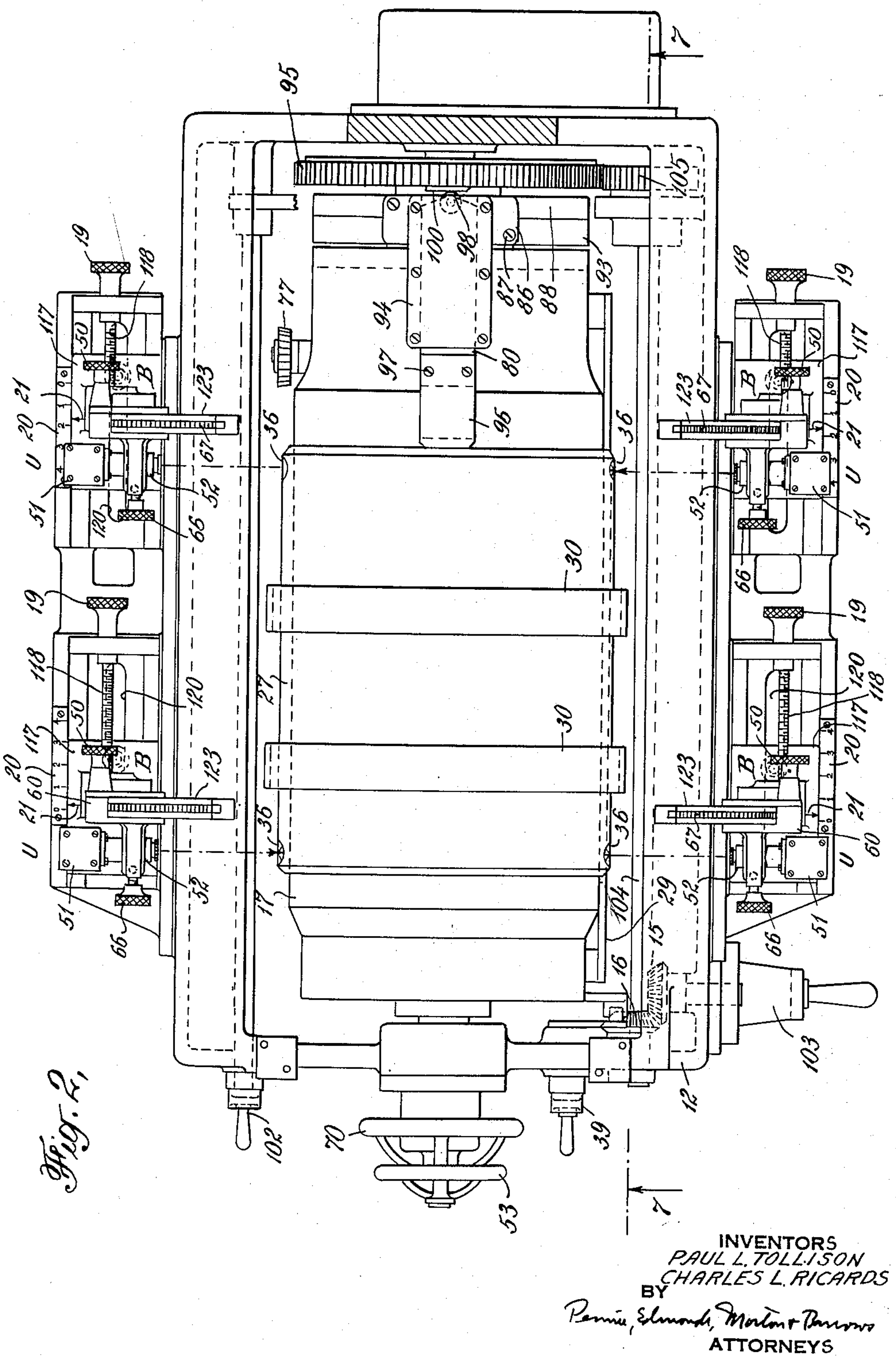
Fig. 2 is a top plan view of the mechanism shown in Fig. 1.
Figures 3, 4, 5:
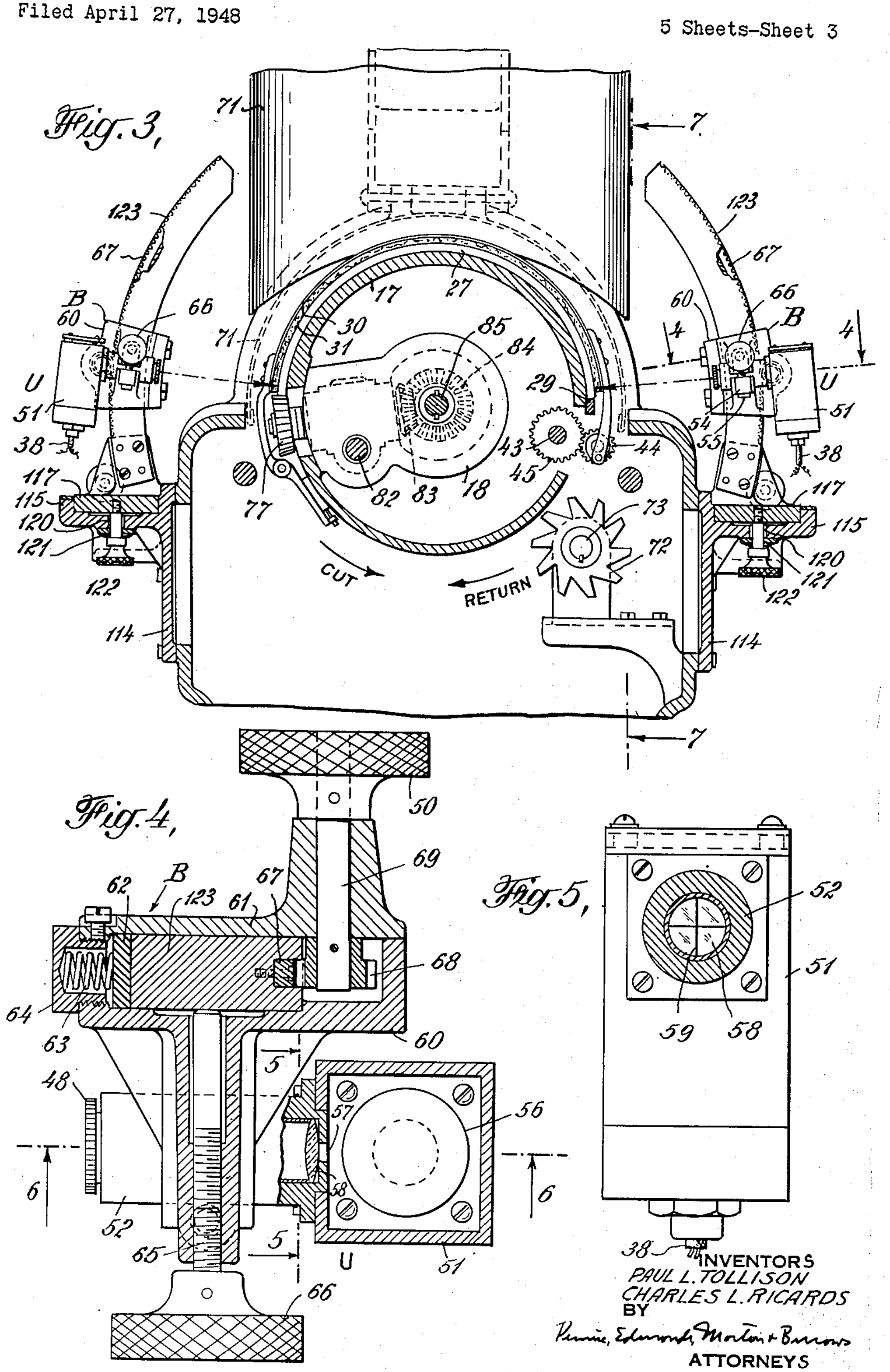
Fig. 3 is a sectional view taken along the line 3—3 of Fig. 1 and viewed in the direction of the arrows.
Fig. 4 is a sectional view on an enlarged scale taken along the line 4—4 of Fig. 3.
Figures 6, 11:
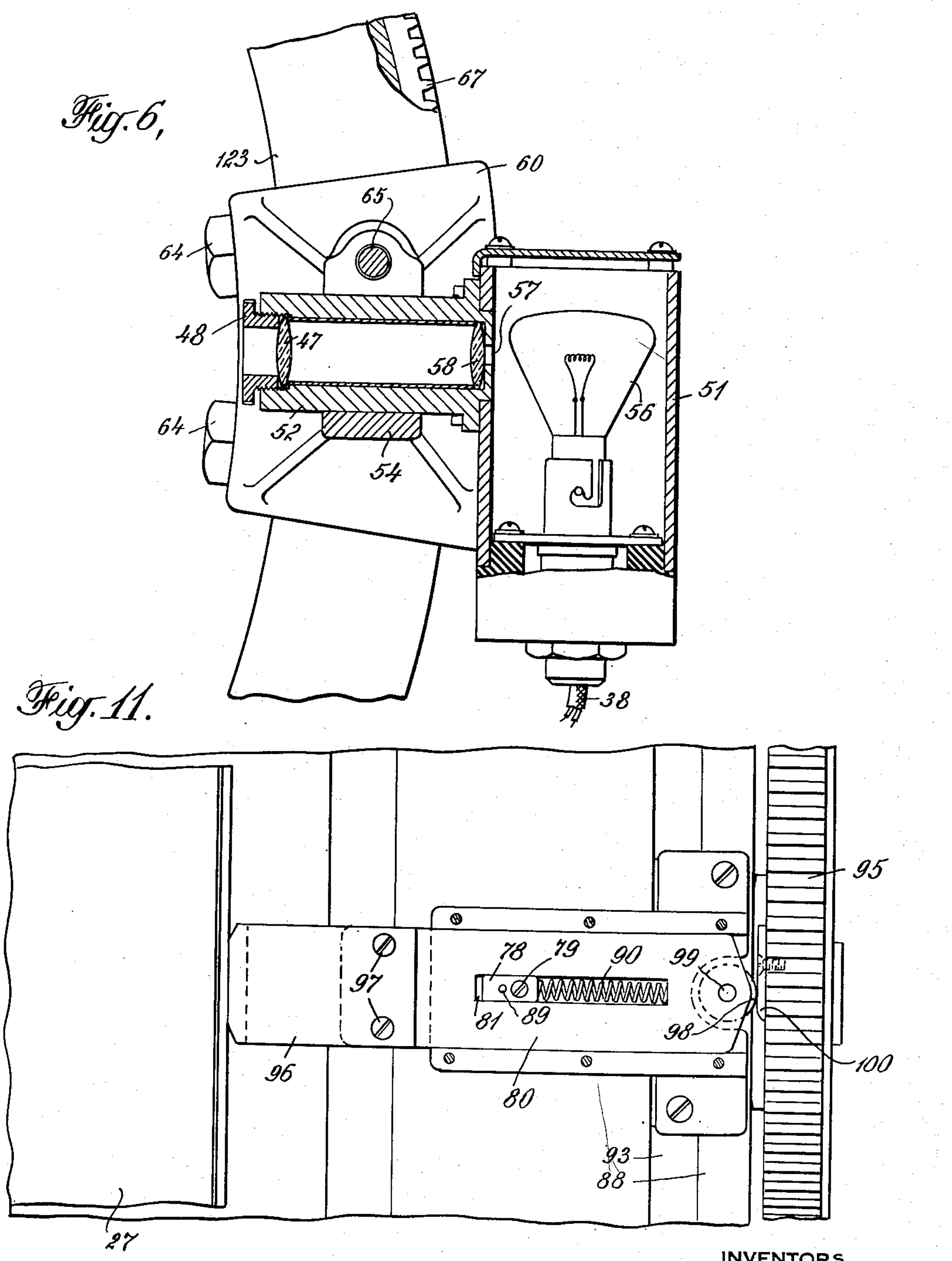
Figure 7:
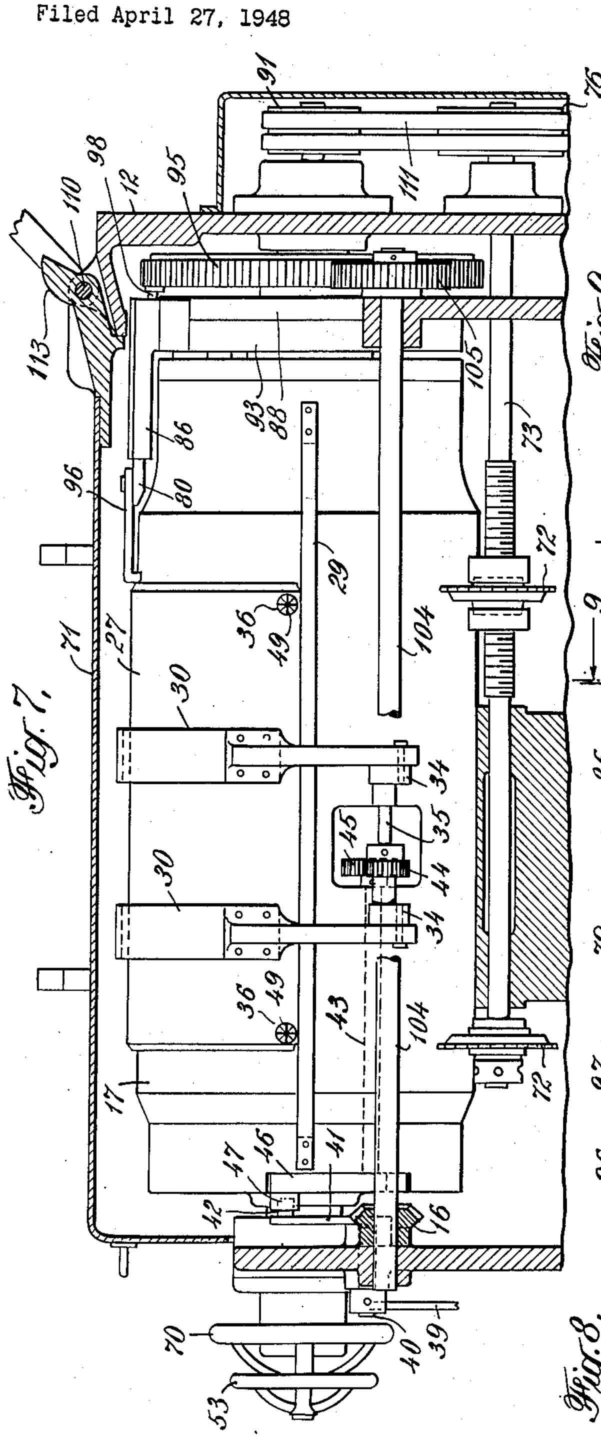
Figures 8, 9, 10:
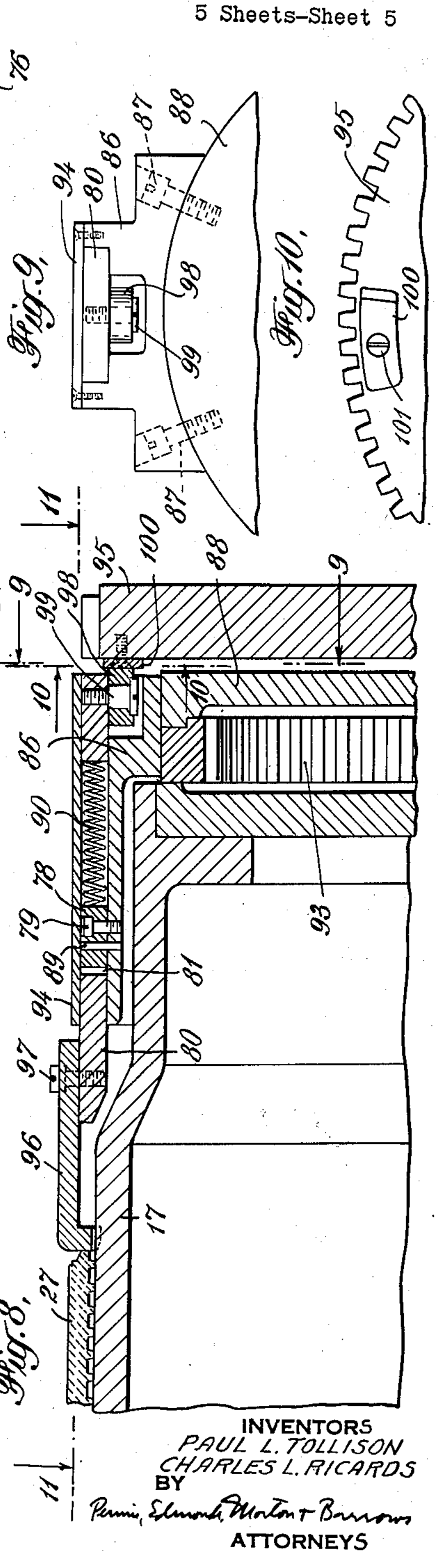

Figs. 5 and 6 are respectively sectional views taken along the lines 5—5 and 6—6 of Fig. 4;

Fig. 7 is a sectional view showing the interior of the mechanism compartment of the machine taken along the line 7—7 of Fig. 2;

Fig. 8 is a sectional view on an enlarged scale of the plate stop mechanism;

Fig. 9 is an end elevation of the mechanism shown in Fig. 8, taken along the line 9—9 of Fig. 8;

Fig. 10 is an end elevation of the plate stop operating cam, taken along the line 10—10 of Fig. 8; and Fig. 11 is a plan view of the plate stop mechanism taken along the line 11—11 of Fig. 8.

Figure 1:
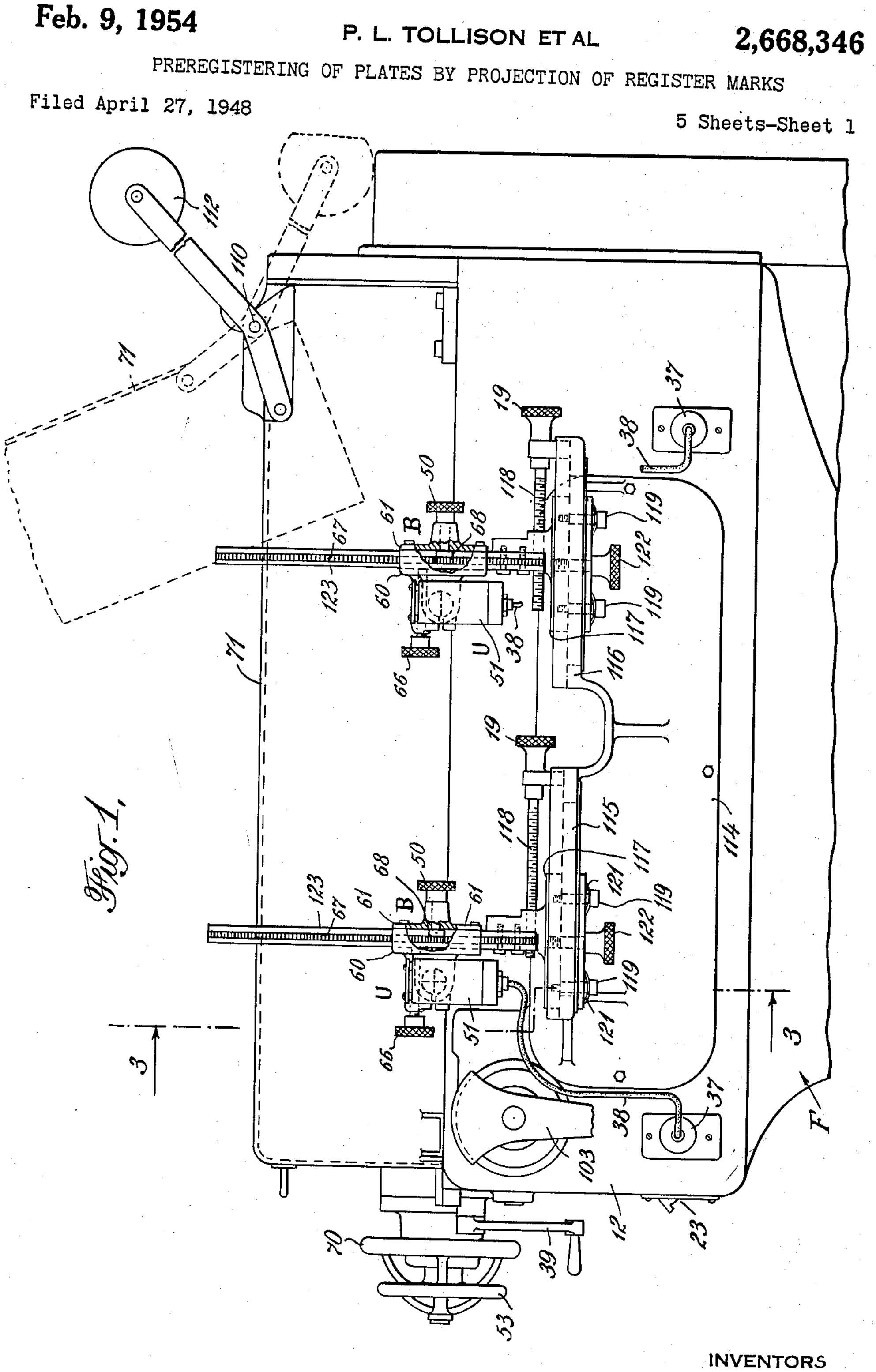
Fig. 1 is a side elevation of a plate registering and trimming machine mechanism embodying the invention.

As shown in Fig. 1, the disclosed machine includes a frame F having a mechanism compartment 12 at its upper end. The left hand end of the compartment 12, as shown in Figs. 1, 2 and 7, constitutes the front of the machine where the operator stands and where the controls are located.

The compartment 12 contains a printing plate carrying cylinder 17 that surrounds and is carried by a carrier 18 (Fig. 3) together with mechanism for adjusting the cylinder circumferentially relative to the carrier and axially of the compartment with the carrier, and mechanism for trimming both end edges and one side edge of a semicylindrical printing plate carried by the cylinder.

The particular mechanism employed to clamp the plate on the cylinder 17, to adjustably move the cylinder 17 and the carrier 18 and to perform the plate edge trimming operations will not be described in detail. Such mechanism is described in the aforesaid Patent No. 2,425,580. For an understanding of the present invention, it is sufficient to explain the general operation of such mechanism.

The plate 27 is clamped in position on the cylinder 17 by straps 30 lined with felt pads 31, and the straps are moved between plate clamping and releasing positions by manipulation of a hand crank 39 which acts through a shaft 40, a crank 41, a crank 46, a shaft 43, pinions 45 and 44, a shaft 35 and cranks 34 connected to the straps 30 (Fig. 7). The pin and lug connection 42, 47, between the cranks 41 and 46 is so arranged as to be completed when the cylinder 17 is in its starting position, and the lugs 47 can move away from the pin 42 when the cylinder 17 rotates. Longitudinal adjustment of the cylinder 17 and the carrier 18 axially of the cylinder is effected by rotation of the hand wheel 70. Circumferential adjustment of the cylinder 17 relative to the carrier 18 is effected by rotation of the hand wheel 53. A pair of spaced cutters 72 trim the curved end edges of the plate 27 as the cylinder 17 is rotated, and these cutters are driven from a suitable motor through the shaft 73, the pulley 76 and the belts 111. The cylinder 17 together with its carrier 18 is rotated to effect such trimming by manually turning a counterweighted crank 103 which drives a shaft 104 through beveled gears 15 and 16 (Figs. 1 and 2). The shaft 104 carries a pinion 105 that engages a gear 95 that is in turn connected to rotate the carrier 18. Such rotation of the carrier and the cylinder moves a plate edge trimming cutter 77 longitudinally of the plate 27 through a screw 82 driven by the rotation of the carrier 18 relative to an internal gear 93 which is fixed against rotation. The cutter 77 is separately driven through the gears 83 and 84, the shaft 85 and the pulley 91. A stop 29 fixed to the cylinder 17 abuts the side edge of the plate 27 opposite that being trimmed by the cutter 77.

A cover 71 is hingedly secured to the mechanism compartment 12 at 110 and is provided with a counter-weight 112. A stop 113 limits the opening movement of the cover. The cover 71 closes the mechanism compartment 12 when the machine is operated to trim a plate, and so prevents throwing of metal chips out of the machine. The cover is shown in full lines in its closed positions in Figs. 1 and 7, and in its open position in Fig. 3. It is shown in broken lines and in its closed position in Fig. 3 and in its open position in Fig. 1.

A crank 102 on the front of the mechanism compartment 12 operates mechanism for releasably locking the gear 95 and hence the cylinder 17 and its carrier 18 against rotational movement when these parts are in the starting position.

Four projector units U are provided, disposed respectively at points near the four corners of a plate 27 on the cylinder 17 in the starting position. These units are adjustable longitudinally of the cylinder and circumferentially thereof, and the construction of the several units and of the several mounting means therefore is identical.

Identical bracket plates 114 are respectively secured to the mechanism compartment 12 on opposite sides of the machine. Each bracket plate 114 carries two aligned integral guides 115 and 116, each of which carries one of the projector unit support slides which slidably engages its guide. Each slide 117 is adjustably movable longitudinally of its guide by a screw 118 threadedly engaging an upwardly extending portion of the slide. A hand knob 19 is provided to operate the screw 118. Each slide 117 is frictionally seated against the bottom of its guide by shoulder screws 119 passing through a guide slot 120 and carrying spring washers 121. A clamp screw 122 also extends through a guide slot 120 and is employed to clamp the slide 117 in its adjusted position. A scale 20 is secured to the guide 115 or 116 of each projector unit and is employed in conjunction with an index mark 21 on the slide 117 to move the projector unit to a predetermined longitudinal seating.

An arcuate rack segment 123 is fixed to and extends upwardly from each slide 117 along an arc concentric with the plate carrying cylinder. As best shown in Fig. 3, the rack segments 123 are sufficiently spaced radially outward from the cylinder 17 to permit the cover 71 to be opened and closed without contact with these segments. With this arrangement, the racks and the projector units carried thereby need not be moved when the machine cover is opened and closed for the removal and replacement of a plate.

Each projector unit U is carried by a bracket B which is in turn slidably adjustable along one of the rack segments 123. As best shown in Figs. 1, 3 and 4, each bracket B includes two parts 60 and 61 which embrace the segment 123 in a passage formed between these parts. A friction plate or gib 62 within this passage is pressed against the inner edge of the segment 123 by springs 63 carried by hollow screws 64. The gib 62 provides sufficient friction to prevent movement of the bracket B along the segment 123 by gravity. A locking screw 65 having a knob 66 is threaded in the part 60 and is used to clamp and lock the bracket B in its adjusted position on the segment 123. The segment 123 carries an arcuate rack 67 secured in a groove in its outer edge, and the rack is engaged by a pinion 68 fixed to a shaft 69 journaled in the bracket part 61. By rotation of a knob 50 on the shaft 69, a bracket B may be adjustably moved up and down the segment 123, thus moving the projector unit U circumferentially of and concentric to the surface of the plate 27 on the cylinder 17.

The projector unit U includes a lamp housing 51 and a projector tube 52 secured thereto. This unit is clamped to the bracket B by a yoke 54 and a screw 55. As shown in Fig. 6, a projection lamp 56 is disposed in the lamp housing 51 with its filament aligned with the axis of the tube 52 which has an opening 57 in its inner end. The inner lens 58 of the projection tube 52 has cross hairs 59 etched thereon as shown in Fig. 5. The outer lens 47 is held in place by a retainer ring 48. The lenses project a register image 49 of the cross hairs 59 onto the surface of a plate 27, and this image may be made to register with a register mark 36 on the plate as shown in Fig. 7. As is customary in plates for color printing, four register marks 36 are cast or otherwise formed adjacent the four corners of each plate at positions which are fixed relative to the cuts and printed matter on the plates.

Power for energizing the lamps 56 of the projector units U is carried from outlets 37 on the mechanism compartment 12 to the units by flexible cables 38 (Fig. 1). A switch 23 on the front of the mechanism compartment controls the energization of the projector unit lamps.

The plate stop mechanism in conjunction with the stop 29 locates the plate 27 on the cylinder 17 before the plate is moved into registry. As shown in Figs. 2, 7, 8, 9 and 11, a bracket 86 is secured by screws 87 to the outer rim of the stationary internal gear 93 and the adjacent disc 88 that supports this gear. A slide 80 is supported in a recess in the bracket 86 and a central longitudinal slot 81 is provided in this slide. A block 78 fixed to the bracket 86 by a screw 79 and a pin 89 engages the slide slot 81. A coiled compressed spring 90 is disposed in the slot 81 between the block 78 and the right hand end of the slot as viewed in Figs. 8 and 11, thus urging the slide 80 toward the right. The slide 80 is held in the recess of the bracket 86 by a cover plate 94, and a plate stop 96 is secured to the inner end of the slide 80 by the screws 97. A roller 98 is rotatably secured to the lower face of the slide 80 at its outer end by a screw stud 99. A cam 100 is fixed to the inner face of the gear 95 by a screw 101. The roller 98 rests on the cam 100 when the cylinder 17 is in the starting position.

After plate 27 is secured to the cylinder 17 with one of its side edges abutting the bar stop 29 and one of its end edges abutting the stop 96, axial adjustment of the plate 27 is obtained by a movement of the cylinder 17 and the carrier 18, and the gears 95 and 93 move axially in unison with the cylinder and its carrier. Circumferential adjustment is obtained by turning the cylinder 17 relative to the carrier 18, the gears 95 and 93 and the plate stop 96. After the plate has been adjustably moved to the desired position, the cylinder 17 and carrier 18 are rotated to trim the plate by means of the crank 103, and during the initial rotary movement of the gear 95 which turns the cylinder 17, the cam 100 moves away from the roller 98 and the plate stop slide 80 is moved outward by the spring 90 so that the plate stop 96 clears the end edge of the plate. This prevents binding between the plate edge and the stop 96 during continued rotation of the plate incident to the trimming operation.

In operation of the improved apparatus, with the cover 71 open, a printing plate 27 which serves as the key plate of the several plates making up a set for color printing, is secured to the cylinder 17 with one of its side edges in contact with the bar stop 29 and one of its end edges in contact with the stop 96. The cylinder 17 is locked in its starting position at this time, the cylinder locking mechanism being governed by the handle 102 in the manner explained in the patent above referred to. One of the projector units U may be longitudinally adjusted by operation of its bracket screw 118 to a predetermined position indicated by the scale 20, and the cylinder 17 is then longitudinally adjusted by the hand wheel 70 until the register mark 36 is in approximate alignment circumferentially of the plate with the projected image 49 from the pre-set projector unit. Then all of the four projector units are adjustably moved by their adjusting screws 118 and pinions 68 to positions where the images 49 that they project are respectively in exact registry with the corresponding register marks 36 adjacent the four corners of the plate. The projector units are locked in these initial positions by tightening the clamp screws 120 and 65. The cover 71 is then closed, the mechanism unlocked by operation of the handle 102, and with the cutters 72 and 77 rotating, the cylinder 17 and carrier 18 are rotated by the crank 103 through almost a full revolution, thus trimming the two end edges of the plate and one of its side edges. The cylinder 17 is returned to its starting position by the crank 103 where it is locked by the mechanism operated by the handle 102. The cover 71 is opened and the key plate 27 is removed from the machine.

One of the other plates of the set is then secured to the cylinder in contact with the stops 29 and 96. The new plate is adjustably moved longitudinally by the hand wheel 70 and circumferentially by the hand wheel 53 until its register marks 36 are respectively in exact registry with the images 49 projected from the corresponding projector units onto the plate surface. The cover 71 is closed and the second plate is trimmed as was the first. The remaining plates of the set are registered and trimmed in turn, the four projector units U remaining locked in their initial set positions throughout this operation.

The registering and trimming operations are considerably simplified and the accuracy of plate registry is improved by the use of the above described mechanism of the present invention. Since the projector units are carried by arcuate means concentric with the plate surface, the images projected by the projector units remain in focus on the plate surface in all positions of the projector units. The projection of the register images permits the disposal of the projector units out of the path of the machine cover so that the position of these units need not be disturbed during the registry and trimming of the several successive plates making up the set. Projection of the registered image prevents error due to parallax in the setting of the plate. The improved end plate stop simplifies initial positioning of the plate on the cylinder.

We claim:

1. A curved stereotype plate registering and trimming machine comprising a mechanism compartment, a plate carrying support in said compartment, means for securing a curved stereotype plate to said support, a plurality of projector units fixed to spaced points of said compartment each including means for projecting an image of a mark onto a plate on said support, means for moving said plate support relative to said compartment, means for adjustably moving each of said projector units relative to said compartment and means in said compartment for trimming said plate.

2. A curved stereotype plate registering and trimming machine comprising a mechanism compartment, a plate carrying support in said compartment, means for securing a curved stereotype plate to said support, a cover hingedly secured to said compartment over said plate carrying support and movable to an open position to expose said support, a plurality of elongated upwardly extending projector unit supports mounted at spaced points on said compartment adjacent but outside the path of movement of said cover, a projector unit carried by each of said elongated supports and including means for projecting an image of a mark onto the surface of a plate on said plate support when said cover is open, means for adjustably moving said units along said elongated supports, means for independently adjustably moving said several supports on said compartment, means for moving said plate support relative to said compartment and means in said compartment for trimming said plate.

3. In a curved stereotype plate registering machine, in combination, a fixed support, a cylinder for supporting a curved stereotype plate mounted on said fixed support, means for moving said cylinder relative to said support, a plurality of elongated arcuate projector unit supports carried by said fixed support at spaced points thereon and extending concentric to said cylinder, a projector unit carried by each of said arcuate supports including means for projecting an image of a mark onto the surface of a plate on said cylinder and means for adjustably moving said projector units along said arcuate supports.

4. A curved stereotype plate registering and trimming machine comprising an elongated mechanism compartment, a plate carrying cylinder mounted in and extending longitudinally of said compartment, means for moving said cylinder relative to said compartment, a plurality of elongated arcuate projector unit supports mounted at spaced points on said compartment and extending concentric to said cylinder, a projector unit carried by each of said arcuate supports and including means for projecting an image of a mark onto the surface of a plate on said cylinder, means for adjustably moving said projector units along said respective arcuate supports and means for adjustably moving said supports on said mechanism compartment longitudinally of said cylinder.

5. A curved stereotype plate registering and trimming machine comprising an elongated open topped mechanism compartment, an elongated cover hingedly secured to said compartment adjacent one end thereof, a plate carrying cylinder in and extending longitudinally of said compartment, means for releasably securing a curved stereotype plate to said cylinder, a plurality of elongated arcuate projector unit supports mounted at spaced points on said compartment outside of the path of movement of said cover and extending upwardly from said compartment concentric with said cylinder, a projector unit carried by each of said supports and including means for projecting an image of a mark onto the surface of a plate on said cylinder, means for adjustably moving said projector units along said supports, means for adjustably moving said supports longitudinally of said compartment, means for rotating said cylinder and means in said compartment for trimming a plate carried on said cylinder when said cylinder is rotated.

6. A curved stereotype plate registering and trimming machine comprising an elongated open topped mechanism compartment, an elongated cover hingedly secured to said mechanism compartment adjacent one end thereof, a plate carrying cylinder mounted in and extending longitudinally of said compartment, means for releasably securing a curved stereotype plate to said cylinder, a plurality of elongated arcuate projector unit supports mounted at spaced points on said compartment outside the path of said cover and extending concentrically with the surface of said cylinder uncovered by said cover, a projector unit including means for projecting the image of a mark onto the surface of a plate on said cylinder slidably mounted on each of said arcuate supports, means on said units and said arcuate supports for adjustably moving said units along their respective supports, means for rotating said cylinder in said compartment and means in said compartment for trimming the edges of a plate on said cylinder when said cylinder is rotated.

7. A curved stereotype plate registering and trimming machine comprising an elongated open topped mechanism compartment, an elongated cover hingedly secured to said mechanism compartment adjacent one end thereof, a plate carrying cylinder mounted in and extending longitudinally of said compartment, means for releasably securing a curved stereotype plate to said cylinder, a plurality of elongated arcuate projector unit supports mounted at spaced points on said compartment outside the path of said cover and extending concentrically with the surface of said cylinder uncovered by said cover, a projector unit including means for projecting the image of a mark onto the surface of a plate on said cylinder slidably mounted on each of said arcuate supports, rack and pinion mechanism for moving said projector units along their respective supports, means for adjustably moving the individual arcuate supports on said compartment longitudinally of said cylinder, means for rotating said cylinder and means in said compartment for trimming the edges of a plate mounted on said cylinder when said cylinder is rotated.

8. A curved stereotype plate registering machine comprising a compartment, a plate carrying cylinder mounted in said compartment, a plurality of projector units mounted at spaced points on said compartment adjacent said cylinder, each of said units including means for projecting the image of a mark onto the surface of a plate on said cylinder, and adjustable mounting means for each of said projector units including means extending longitudinally of and parallel to the axis of said cylinder and means extending circumferentially of and concentric with said cylinder for permitting independent adjustable movement of each of said units in two directions parallel to the surface of said cylinder.

9. A curved type-forming element registering and trimming machine comprising a mechanism compartment, a support for a curved type-forming element in said compartment, a plurality of projector units fixed to spaced points of said compartment, each including means for projecting an image of a mark on a type-forming element on said support, means for adjustably moving each of said projector units relative to said support, and means connected to said compartment for trimming a type-forming element on said support.

PAUL L. TOLLISON.
CHARLES L. RICARDS.

References Cited in the file of this patent

UNITED STATES PATENTS

| Number | Name | Date |
|---|---|---|
| 2,061,292 | Smith | Nov. 17, 1936 |
| 2,187,106 | Tornberg | Jan. 16, 1940 |
| 2,247,997 | Griner et al. | July 1, 1941 |
| 2,268,293 | Lundeberg | Dec. 30, 1941 |
| 2,293,091 | Wood et al. | Aug. 18, 1942 |
| 2,369,223 | Ferger | Feb. 13, 1945 |
| 2,425,580 | Tornberg et al. | Aug. 12, 1947 |